US012699684B2

(12) United States Patent
Lai et al.

(10) Patent No.: US 12,699,684 B2
(45) Date of Patent: Aug. 4, 2026

(54) TRANSACTION PROCESSING METHOD, DEVICE, AND STORAGE MEDIUM

(71) Applicant: CLOUD INTELLIGENCE ASSETS HOLDING (SINGAPORE) PRIVATE LIMITED, Singapore (SG)

(72) Inventors: Ziliang Lai, Hangzhou (CN); Hua Fan, Hangzhou (CN); Wenchao Zhou, Hangzhou (CN); Zhanfeng Ma, Hangzhou (CN); Xiang Peng, Hangzhou (CN); Feifei Li, Hangzhou (CN)

(73) Assignee: CLOUD INTELLIGENCE ASSETS HOLDING (SINGAPORE) PRIVATE LIMITED, Singapore (SG)

( * ) Notice: Subject to any disclaimer, the term of this patent is extended or adjusted under 35 U.S.C. 154(b) by 0 days.

(21) Appl. No.: 18/996,662

(22) PCT Filed: Aug. 8, 2023

(86) PCT No.: PCT/CN2023/111820
§ 371 (c)(1),
(2) Date: Jan. 17, 2025

(87) PCT Pub. No.: WO2024/032632
PCT Pub. Date: Feb. 15, 2024

(65) Prior Publication Data
US 2025/0217345 A1     Jul. 3, 2025

(30) Foreign Application Priority Data
Aug. 9, 2022     (CN) .......................... 202210952643.0

(51) Int. Cl.
*G06F 16/23*     (2019.01)
*G06F 9/46*      (2006.01)

(52) U.S. Cl.
CPC .......... *G06F 16/2343* (2019.01); *G06F 9/466* (2013.01); *G06F 16/2322* (2019.01)

(58) Field of Classification Search
None
See application file for complete search history.

(56)          References Cited

U.S. PATENT DOCUMENTS 8,676,851 B1     3/2014 Nesbit et al.
2007/0219999 A1*  9/2007 Richey ................ G06F 16/2329
(Continued)

FOREIGN PATENT DOCUMENTS

CN          109901914 A      6/2019
CN          110196760 A      9/2019
(Continued)

OTHER PUBLICATIONS

Notice of Allowance received in CN202210952643.0, dated Jun. 2, 2025, in 7 pages (with translation).
(Continued)

*Primary Examiner* — Kavita Stanley
*Assistant Examiner* — Cao D Vuong
(74) *Attorney, Agent, or Firm* — Procopio, Cory, Hargreaves & Savitch LLP

(57)          ABSTRACT

Embodiments of the present application provide a transaction processing method, a device, and a storage medium. For a distributed transaction, it is proposed innovatively that exclusive locks are added to data records involved in a read set of the distributed transaction in a read phase; in a write phase, write operations for a write set can be directly executed based on these exclusive locks, and an exclusive lock on a related data record can be released immediately after a write operation is completed. In the write phase, the exclusive locks added to the data records can maintain the exclusivity of the distributed transaction over these data (Continued)

records, which can avoid the write operation abort problem in the write phase.

20 Claims, 5 Drawing Sheets

(56)                     References Cited

U.S. PATENT DOCUMENTS

| | | | |
|---|---|---|---|
| 2009/0172305 | A1 | 7/2009 | Shpeisman et al. |
| 2009/0287703 | A1* | 11/2009 | Furuya ................ G06F 16/2322 |
| 2019/0065516 | A1* | 2/2019 | Barker .................... G06F 16/13 |
| 2020/0034308 | A1* | 1/2020 | Shveidel .............. G06F 3/0622 |
| 2021/0318813 | A1* | 10/2021 | Roy ........................ G06F 3/067 |
| 2022/0004533 | A1* | 1/2022 | Mihály ................... G06F 9/466 |
| 2023/0021150 | A1* | 1/2023 | VanBenschoten .... G06F 16/273 |

FOREIGN PATENT DOCUMENTS

| | | |
|---|---|---|
| CN | 111338766 A | 6/2020 |
| CN | 111459920 A | 7/2020 |
| CN | 111475262 A | 7/2020 |
| CN | 111597015 A | 8/2020 |
| CN | 114327799 A | 4/2022 |
| CN | 115454656 A | 12/2022 |

OTHER PUBLICATIONS

Lai, Ziliang et al., "Knock Out 2PC with Practicality Intact: a High-performance and General Distributed Transaction Protocol", arXiv, Mar. 1, 2023, pp. 1-25.
International Search Report and Written Opinion received in PCT/CN2023/111820, dated Nov. 10, 2023, in 13 pages (with translation).
Extended European Search Report received in EP23851853.4, dated Nov. 7, 2025, in 10 pages.
Athanassoulis, Manos et al. "Improving OLTP concurrency through Early Lock Release", EPFL-Report—152158, Jan. 2009, in 12 pages.
Burckhardt, Sebastian et al., "Orleans Transactions", in 6 pages (PowerPoint Presentation).

* cited by examiner

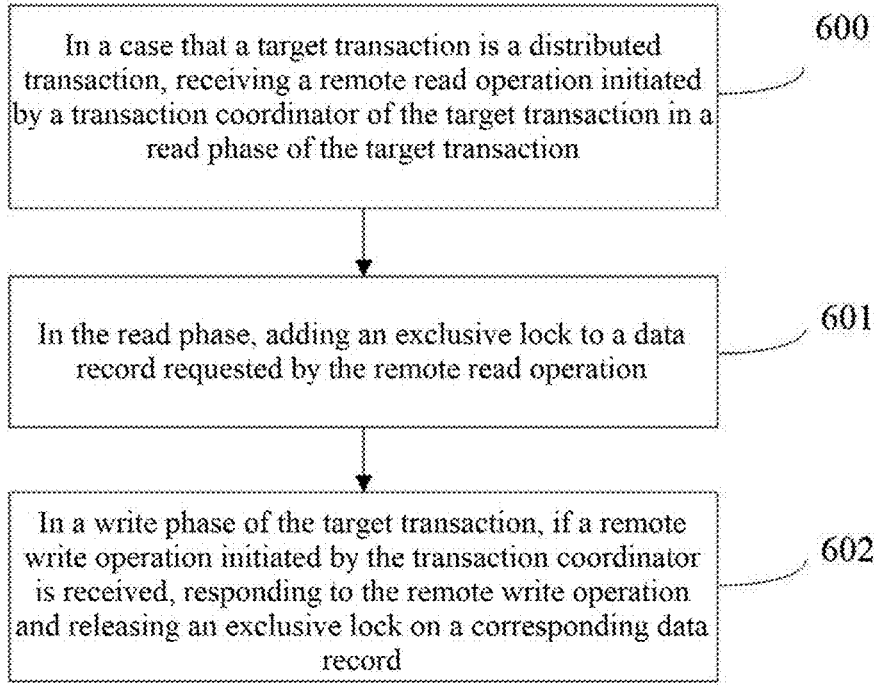

In a case that a target transaction is a distributed transaction, receiving a remote read operation initiated by a transaction coordinator of the target transaction in a read phase of the target transaction    600

In the read phase, adding an exclusive lock to a data record requested by the remote read operation    601

In a write phase of the target transaction, if a remote write operation initiated by the transaction coordinator is received, responding to the remote write operation and releasing an exclusive lock on a corresponding data record    602

FIG. 6

Memory 70

Processor 71

Power supply component 73

Communication component 72

FIG. 7

TRANSACTION PROCESSING METHOD, DEVICE, AND STORAGE MEDIUM

CROSS-REFERENCE TO RELATED APPLICATIONS

The present application is a National Stage of International Application No. PCT/CN2023/111820, filed on Aug. 8, 2023, which claims priority to Chinese Patent Application No. 202210952643.0, filed to China National Intellectual Property Administration on Aug. 9, 2022, and entitled "TRANSACTION PROCESSING METHOD, DEVICE, AND STORAGE MEDIUM". These applications are hereby incorporated by reference in their entireties.

TECHNICAL FIELD

The present application relates to the field of database technologies and, in particular, to a transaction processing method, a device, and a storage medium.

BACKGROUND

A database transaction is a set of indivisible SQL statements, and the set of SQL statements is a logical working unit. A database transaction involving multiple shards in a distributed database may be referred to as a distributed transaction, and the distributed transaction may include multiple sub-transactions. Different sub-transactions may need to access different shards, and each sub-transaction may include at least one piece of statement logic.

An example of the distributed transaction is transferring money from one bank account to another bank account. In this case, two steps of operations are usually included: one UPDATE statement is responsible for subtracting a certain amount of money from a total amount of one bank account, and another UPDATE statement is responsible for adding the corresponding amount of money to another bank account. Both the decreasing operation and the increasing operation must be permanently recorded into related shards, otherwise the money will be lost. If there is a problem with transferring money, both the decreasing operation and the increasing operation must be cancelled simultaneously. That is, the processing for the distributed transaction needs to ensure atomicity.

At present, a two phase commit protocol (2PC) is generally used to ensure the atomicity of the distributed transaction. The first phase of the two phase commit protocol is a voting phase, and in this phase, all participants (shards) send feedback information on whether current sub-transactions can be successfully executed to a coordinator (shard). The second phase is a commit phase, and in this phase, the coordinator notifies, according to the feedback information sent by all participants, all participants to commit the current sub-transactions in unison, or to roll back the current sub-transactions in unison. Therefore, the two phase commit protocol needs to introduce multiple network round trips in a transaction processing path, and lock-holding time of the distributed transaction in the two phase commit protocol is too long, resulting in poor throughput for distributed transactions.

SUMMARY

Various aspects of the present application provide a transaction processing method, a device, and a storage medium to improve the transaction processing efficiency.

An embodiment of the present application provides a transaction processing method, applied to a transaction coordinator, the method including:

receiving a processing request for a target transaction;

if it is determined that the target transaction is a distributed transaction, acquiring, in a read phase of the target transaction, an exclusive lock for each data record involved in a read set of the target transaction;

calculating a write set of the target transaction; releasing an exclusive lock on a data record in the read set on which a write operation does not require to be executed;

in a write phase of the target transaction, releasing an exclusive lock on a related data record after completing a write operation for the write set based on the exclusive lock.

An embodiment of the present application further provides a transaction processing method, applied to a transaction participant, the method including:

in a case that a target transaction is a distributed transaction, receiving a remote read operation initiated by a transaction coordinator of the target transaction in a read phase of the target transaction;

in the read phase, adding an exclusive lock to a data record requested by the remote read operation;

in a write phase of the target transaction, if a remote write operation initiated by the transaction coordinator is received, responding to the remote write operation and releasing an exclusive lock on a corresponding data record.

An embodiment of the present application further provides a transaction coordinator, including a memory, a processor, and a communication component;

the memory is configured to store one or more computer instructions;

the processor is coupled to the memory and the communication component, and is configured to execute the one or more computer instructions to:

receive a processing request for a target transaction through the communication component;

if it is determined that the target transaction is a distributed transaction, acquire, in a read phase of the target transaction, an exclusive lock for each data record involved in a read set of the target transaction;

calculate a write set of the target transaction;

release an exclusive lock on a data record in the read set on which a write operation does not require to be executed;

in a write phase of the target transaction, release an exclusive lock on a related data record after completing a write operation for the write set based on the exclusive lock.

An embodiment of the present application further provides a transaction participant, including a memory, a processor, and a communication component;

the memory is configured to store one or more computer instructions;

the processor is coupled to the memory and the communication component, and is configured to execute the one or more computer instructions to:

in a case that a target transaction is a distributed transaction, receive, through the communication component, a remote read operation initiated by a transaction coordinator of the target transaction in a read phase of the target transaction;

in the read phase, add an exclusive lock to a data record requested by the remote read operation;

in a write phase of the target transaction, if a remote write operation initiated by the transaction coordinator is received, respond to the remote write operation and release an exclusive lock on a corresponding data record.

An embodiment of the present application further provides a computer-readable storage medium storing computer instructions, where when the computer instructions are executed by one or more processors, the one or more processors are caused to perform the aforementioned transaction processing methods.

In the embodiments of the present application, for the distributed transaction, it is proposed innovatively that exclusive locks can be added to data records involved in the read set of the distributed transaction in the read phase; in the write phase, write operations for the write set can be directly executed based on these exclusive locks, and the exclusive lock on the related data record can be released immediately after the write operation is completed. In the write phase, the exclusive locks added to the data records can maintain the exclusivity of the distributed transaction over these data records, which can avoid the write operation abort problem in the write phase. That is, all write operations of the distributed transaction are bound to succeed, thereby ensuring the atomicity of distributed transaction processing. In addition, since the exclusive lock is released immediately after the write operation is completed, the lock-holding time of the distributed transaction is only the time inherently required to execute transaction logic of the distributed transaction, thereby greatly reducing the lock-holding time of the distributed transaction, effectively increasing the throughput for distributed transactions and improving the transaction processing efficiency.

BRIEF DESCRIPTION OF DRAWINGS

The accompanying drawings described herein are used to provide further understanding of the present application, and constitute a part of the present application. The illustrative embodiments of the present application and their descriptions are used to explain the present application, and do not constitute improper limitation to the present application. In the accompanying drawings:

FIG. 6 is a schematic flowchart of another transaction processing method provided by another exemplary embodiment of the present application;

FIG. 7 is a schematic structural diagram of a transaction coordinator provided by yet another exemplary embodiment of the present application;

DESCRIPTION OF EMBODIMENTS

Figure 1:
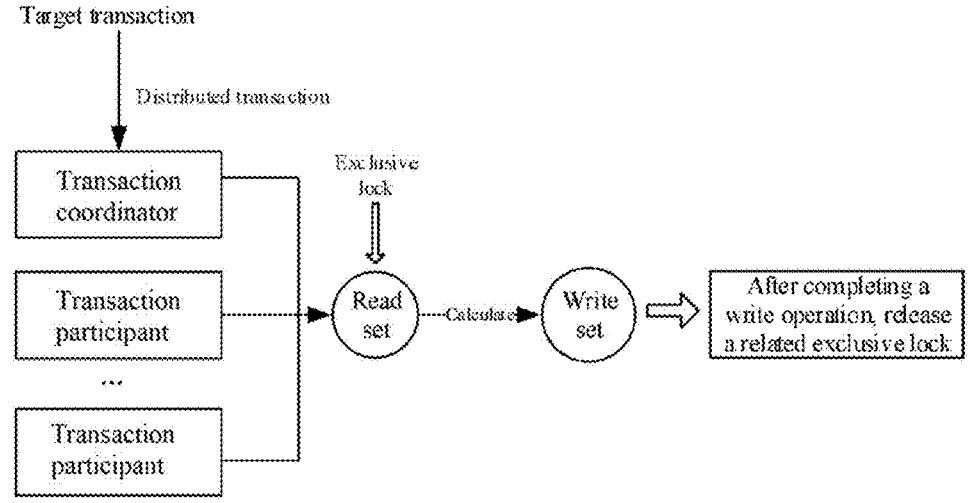
FIG. 1 is a schematic structural diagram of a transaction processing system provided by an exemplary embodiment of the present application.

In order to make objectives, technical solutions, and advantages of the present application clearer, the technical solutions of the present application will be described clearly and comprehensively in conjunction with specific embodiments and corresponding accompanying drawings of the present application. Obviously, the described embodiments are part of the embodiments of the present application, but not all of the embodiments. Based on the embodiments of the present application, all other embodiments obtained by those of ordinary skill in the art without creative efforts belong to the protection scope of the present application.

At present, the commonly used two phase commit protocol needs to introduce multiple network round trips in a transaction processing path, and lock-holding time of a distributed transaction in the two phase commit protocol is too long, resulting in poor throughput for distributed transactions. In view of this, in some embodiments of the present application, for a distributed transaction, exclusive locks can be added to data records involved in a read set of the distributed transaction in a read phase; in a write phase, write operations for a write set can be directly executed based on these exclusive locks, and an exclusive lock on a related data record can be released immediately after a write operation is completed. In the write phase, the exclusive locks added to the data records can maintain the exclusivity of the distributed transaction over these data records, which can avoid the write operation abort problem in the write phase. That is, all write operations of the distributed transaction are bound to succeed, thereby ensuring the atomicity of distributed transaction processing. In addition, since the exclusive lock is released immediately after the write operation is completed, the lock-holding time of the distributed transaction is only the time inherently required to execute transaction logic of the distributed transaction, thereby greatly reducing the lock-holding time of the distributed transaction, effectively increasing the throughput for distributed transactions and improving the transaction processing efficiency.

Before starting to describe the technical solutions, technical concepts that may be involved are briefly explained first.

Distributed system: Data in the system is stored in different local storage regions (which may be referred to as shards), managed by different management systems, run on different machines, supported by different operating systems, and connected together by different communication networks.

Transaction: A transaction may be formed by a finite sequence of operations, where each element in the sequence of operations is a piece of transaction logic. Transactions may include local transactions and distributed transactions. In different application scenarios, types of transactions may be different. For example, in a database scenario, a corresponding transaction type is a database transaction. For another example, in a stream processing scenario, a corresponding transaction type may be a stream processing transaction.

Local transaction: A local transaction is limited to access control of a single storage resource. For example, for a distributed database, a database transaction that only accesses a certain shard may be understood as a local transaction on that shard.

Distributed transaction: A distributed transaction refers to that participant(s) of the transaction, a server supporting the transaction, a resource server, and a transaction manager are located on different nodes of different distributed systems, respectively. The distributed transaction may include multiple pieces of statement logic, and data records accessed by different pieces of statement logic may be distributed on different shards.

Atomicity of distributed transaction: It may be understood that it is required to ensure that multiple pieces of statement logic in a distributed transaction are either all committed or all rolled back, and the distributed transaction needs to ensure data consistency on different shards.

Exclusive lock: An exclusive lock is also referred to as X lock. If Transaction T adds an exclusive lock to Data record A, Transaction T can read or modify A, and other transactions cannot add any locks to A until T releases the exclusive lock on A.

Shared lock: A shared lock is also referred to as S lock. If Transaction T adds a shared lock to Data record A, Transaction T can read A but cannot modify A, and when reading A, the S lock needs to be upgraded to X lock; other transactions can only add shared locks to A, but cannot add an exclusive lock until T releases the shared lock on A.

The technical solutions provided by various embodiments of the present application are described in detail with reference to the accompanying drawings.

FIG. 1 is a schematic structural diagram of a transaction processing system provided by an exemplary embodiment of the present application. Referring to FIG. 1, the system may include a transaction coordinator and at least one transaction participant, where the transaction coordinator and the transaction participant are defined based on work roles. For a distributed system, it includes multiple shards, and each shard may adaptively assume a work role of a coordinator or a participant for different transactions. For different transactions, coordinators and participants involved may be different, and the number of shards involved may also be different. For example, a shard may be the transaction coordinator for transaction T1, but that shard may also be a transaction participant for transaction T2. In practical applications, a shard having the first data record that a transaction needs to read may be used as the transaction coordinator of the transaction, and other shards participating in the transaction processing work may be used as transaction participants of the transaction. Of course, this is merely exemplary, and this embodiment is not limited to this work role definition solution.

For a transaction, it may be executed according to a read phase and a write phase. The transaction processing solutions provided by the embodiments aim to prevent an abort from occurring in the write phase, so as to ensure that a distributed transaction can be inevitably committed after the read phase, thereby ensuring the atomicity of distributed transaction processing. Furthermore, the traditional two phase commit solution is discarded and a single phase commit solution is proposed to shorten the lock-holding time of the distributed transaction, and thus the throughput is improved.

For ease of description, a target transaction is taken as an example in this embodiment to describe an implementation solution of a transaction coordinator and transaction participants in a process of cooperatively processing the target transaction. However, it should be understood that in addition to the target transaction, the transaction processing system provided in this embodiment can also use the same technical solution to process other transactions, and support concurrent processing of transactions.

Therefore, referring to FIG. 1, a processing request for the target transaction may be sent to the transaction coordinator, where the processing request is initiated by an initiator of the target transaction. For the transaction coordinator, it may determine whether the target transaction is a distributed transaction. Generally, whether a transaction is a distributed transaction cannot be identified before execution. Therefore, in an exemplary solution, the transaction coordinator may run pieces of statement logic in the target transaction in the read phase of the target transaction. If there is remote read logic in the pieces of statement logic, the target transaction may be determined as a distributed transaction. For example, the target transaction may include three pieces of statement logic. Read logic in the first piece of statement logic is local read logic, that is, what needs to be read is a local data record belonging to the transaction coordinator, and at this time, whether the target transaction is a local transaction cannot be determined yet. Continuing to execute the second piece of statement logic, read logic in the second piece of statement logic is remote read logic, that is, what needs to be read is a data record on a certain transaction participant of the target transaction, rather than the local data record on the transaction coordinator, and thus the target transaction can be determined as a distributed transaction. Herein, each piece of statement logic in the transaction corresponds to one SQL query statement. In the distributed transaction, data records corresponding to different pieces of statement logic may be distributed on different shards.

If the target transaction is a distributed transaction, an exclusive lock may be acquired for each data record involved in a read set of the target transaction in the read phase of the target transaction. That is, each read operation of the target transaction will cause an exclusive lock to be generated on a corresponding data record, and the exclusive locks can ensure that the target transaction enjoys exclusive rights to these data records.

In the process of acquiring the exclusive lock for each data record involved in the read set, for the transaction coordinator, a local data record belonging to the transaction coordinator in the read set may be determined, and an exclusive lock is added to the local data record. The transaction coordinator may also trigger the transaction participants to which respective non-local data records in the read set belong to add exclusive locks to corresponding data records. To this end, the transaction coordinator may initiate remote read operations to the transaction participants, and for the transaction participants, the exclusive locks may be added to the data records requested by the remote read operations in the read phase to ensure the exclusivity of the target transaction over these data records. In this way, through the collaborative operations between the transaction coordinator and the transaction participants of the target transaction, the exclusive lock can be acquired for each data record involved in the read set of the target transaction.

Figure 2:
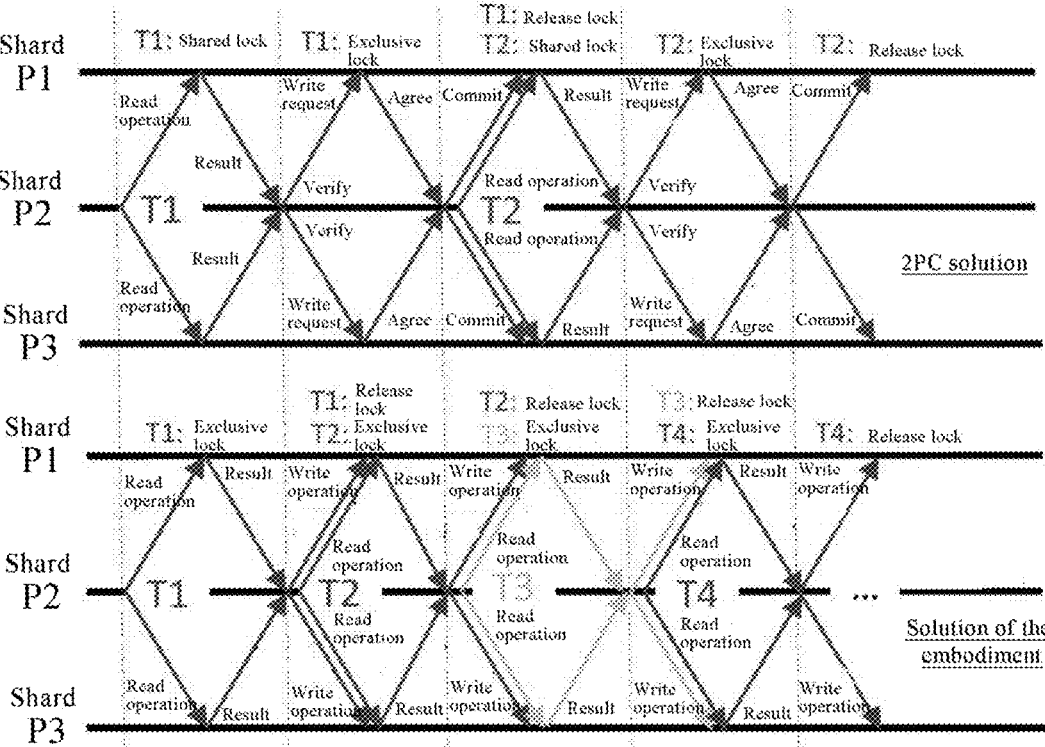
FIG. 2 is a schematic diagram of a comparison between a traditional two phase commit protocol and a technical solution of an embodiment of the present application.

FIG. 2 is a schematic diagram of a comparison between the traditional two phase commit protocol and the technical solution of this embodiment of the present application. Referring to FIG. 2, it can be obviously found that under the traditional two phase protocol, a read phase of a distributed transaction is in a voting phase, and in the read phase, shared locks are acquired for data records involved in a read set of the distributed transaction. A write phase of the distributed transaction is in a commit phase under the two phase protocol. Referring to FIG. 2, under the two phase protocol, at least two phases of network round trips are required to complete the execution of the distributed transaction. In the technical solution of this embodiment of the present application, a single phase commit method is innovatively proposed, where both the read phase and the write phase of the distributed transaction are in this single phase, and the exclusive locks, rather than shared locks, are acquired for the data records involved in the read set of the distributed transaction in the read phase. Referring to FIG. 2, in the technical solution of this embodiment, only a single phase of network round trip is required to complete the processing of the distributed transaction, which invisibly shortens the cost of network round trip required for the distributed transaction, thus effectively improving the processing efficiency of the distributed transaction.

In this embodiment, all statement logic of the target transaction may be run in the read phase of the target transaction, so as to generate a complete read set of the target transaction, and the read set of the target transaction may be cached in a specified data structure on the transaction coordinator. In addition, in the technical solution of this embodiment, read logic and write logic in the target transaction are allowed to be interleaved. In this way, after running all the statement logic of the target transaction in the read phase, a write set of the target transaction may also be generated, and may be cached in the transaction coordinator for being invoked in the write phase. In this embodiment, it may be assumed that the read set of the target transaction may cover the write set of the target transaction, that is, the data records involved in the write set are part or all of the data records involved in the read set. In this case, the exclusive locks acquired on the read set can ensure writing for the write set without abort. In a case of violating this assumption, it can be called blind writing, that is, the write set involves a data record not involved in the read set. In this case, this embodiment proposes a remedial solution. An exemplary remedial solution may be that the transaction coordinator may check whether the read set of the target transaction covers the write set. If not, virtual reading may be performed on data records that are involved in the write set but are not involved in the read set, and exclusive locks are acquired for such type of data records. That is, in the read phase of the target transaction, such type of data records are not actually read, but only the exclusive locks are acquired for such type of data records. If such type of data records are non-local data records that do not belong to the transaction coordinator, operations of acquiring the exclusive locks may be performed in a batch together with other normal remote read operations, and in the absence of other normal remote read operations, additional round trips need to be added to such type of data records as the cost of violating the assumption.

In this way, in this embodiment, it can be ensured that each data record involved in the write set of the target transaction has obtained the exclusive lock in the read phase.

Based on this, for the transaction coordinator, in the write phase of the target transaction, an exclusive lock on a related data record may be released after completing a write operation for the write set based on the exclusive lock. The write operation refers to updating the data record according to a new value calculated for the data record in the write set. Here, the transaction coordinator may perform batch processing on the write set of the target transaction. However, it should be understood that the exclusive lock release processes of the data records involved in the write set are independent of each other, without any dependency or synchronization relationship. After the write operation of a single data record is completed, the exclusive lock on that data record can be immediately released without relying on the lock release situation on other data records.

In the write phase of the target transaction, for the transaction coordinator, a local data record belonging to the transaction coordinator in the write set may be determined. After completing the write operation based on an exclusive lock on the local data record, the exclusive lock is released. The transaction coordinator may also initiate, for respective non-local data records in the write set, write operations to the transaction participants to which the respective non-local data records belong, so that the transaction participants release exclusive locks on the corresponding data records after responding to the write operations. To this end, the transaction coordinator may initiate remote write operations to the transaction participants, and for a transaction participant, if a remote write operation initiated by the transaction coordinator is received, the transaction participant may respond to the remote write operation and release an exclusive lock on a corresponding data record. In this way, no matter the local write operation or the remote write operation, it can be ensured that the exclusive lock on the corresponding data record is immediately released after the write operation is completed.

It can be seen that in the technical solution of this embodiment, by acquiring the exclusive locks in the read phase, it is ensured that the distributed transaction does not roll back once writing is started, and the exclusive lock will be immediately released after writing. In this way, the lock-holding time of the distributed transaction is only the actual execution time of its transaction logic. Continuing to refer to FIG. 2, under the traditional two phase protocol, the lock-holding time of distributed transaction T1 for a corresponding data record on shard P1 is: read operation—result—write request—verify—agree—commit, which takes a very long time. Looking at the technical solution of this embodiment, the lock-holding time of distributed transaction T1 for a corresponding data record on shard P1 is only: read operation—result write operation, which saves half of the lock-holding time compared to the traditional two phase protocol. Reduction of the lock-holding time of a single transaction can free up processing time for more other transactions, thus effectively improving the throughput of distributed transaction processing.

As mentioned previously, it is assumed that the read set of the target transaction may cover the write set, so there may be data records in the read set on which the write operations do not require to be executed. In this embodiment, exclusive locks on this part of data records may be released in time, so as to reduce the lock-holding time of the target transaction for this part of data records. In this embodiment, after it can be determined the write operations do not require to be executed on which data records in the read set, the exclusive locks on these data records may be released immediately. Exemplary release timing may be: in the write phase of the target transaction, if any local data record in the read set is determined as no write operation being required to be executed thereon, the exclusive lock on this local data record is released. In this embodiment, after entering the writing phase, the data record in the read set on which the write operation does not require to be executed can be found in time, so that the exclusive lock on the data record can be released immediately. Of course, in this embodiment, the timing of releasing the exclusive lock on the data record in the read set on which the write operation does not require to be executed is not limited to this, and may also be set to other timing.

In this way, it can be ensured that the exclusive locks acquired in the read phase for the respective data records involved in the read set can all be released in time, so that the lock-holding time of the distributed transaction for the data records is short enough.

Accordingly, in this embodiment, for the distributed transaction, the exclusive locks can be added to the data records involved in the read set of the distributed transaction in the read phase. In the write phase, the write operations for the write set can be directly executed based on these exclusive locks, and the exclusive lock on the related data record can be released immediately after the write operation is completed. In the write phase, the exclusive locks added to the data records can maintain the exclusivity of the distributed transaction over these data records, which can avoid the write operation abort problem in the write phase. That is, all write operations of the distributed transaction are bound to succeed, thereby ensuring the atomicity of distributed transaction processing. In addition, since the exclusive lock is released immediately after the write operation is completed, the lock-holding time of the distributed transaction is only the time inherently required to execute transaction logic of the distributed transaction, thereby greatly reducing the lock-holding time of the distributed transaction, effectively increasing the throughput for distributed transactions and improving the transaction processing efficiency.

The single phase commit solution provided by this embodiment is very friendly to the distributed transaction, and can effectively avoid the write abort problem in the distributed transaction. However, the inventors found during the research that the exclusive locks acquired in the single phase commit solution may prevent other transactions from accessing the data records, especially innocent local transactions. However, the proportion of local transactions in all transactions is still very considerable, and the read phase of the local transaction may be affected by the exclusive locks introduced in the single phase commit solution proposed in this embodiment.

Therefore, in a preferred design solution, the technical concept of adopting different processing modes for local transactions and distributed transactions is proposed.

Continuing the processing logic of determining whether the target transaction is a distributed transaction as mentioned above, here, if there is no remote read logic in the pieces of statement logic of the target transaction, the target transaction is determined as a local transaction. In a case that the target transaction is the local transaction, a read operation may be executed in a lock-free manner in a read phase of the target transaction to obtain a read set of the target transaction. In a write phase of the target transaction, an exclusive lock is acquired for each data record involved in a write set of the target transaction to execute a write operation.

In this way, for the local transaction, the read operation may be executed in the lock-free manner. That is, it is not necessary to acquire any lock for the local transaction in the read phase. It is also not necessary to concern whether there is a lock on a data record that needs to be read, and the data record can be defaulted to be lock-free for unobstructed reading. Therefore, executing the read operation in the lock-free manner can avoid the impact of exclusive locks introduced during distributed transaction processing on the read phase of the local transaction.

In this embodiment, an optimistic concurrent control (OCC) technology may be used to implement the read phase for the local transaction. The implementation solution used may include but is not limited to TICTOC, multi version concurrency control MVCC, etc.

Since the read phase of the local transaction uses the lock-free manner, there may be a situation where a related data record is updated during a period after the occurrence of the read operation of the local transaction and before the occurrence of the write operation, thus causing a problem of data inconsistency. In order to avoid this problem, in this embodiment, a verification phase may be added to the processing process of the local transaction, and consistency verification may be performed on the read set of the local transaction in the verification phase. In this embodiment, consistency verification on the read set of the local transaction may be implemented based on a timestamp. Therefore, in this embodiment, it is proposed to introduce the timestamp in the processing process of the distributed transaction to support coordination between the local transaction and the distributed transaction. In this embodiment, the timestamp introduced for the distributed transaction may include but is not limited to a logical timestamp of a transaction, a read timestamp of a data record, or a write timestamp of a data record.

In addition, there is a special case here. After introducing the solution of executing the read operation in the lock-free manner for the local transaction, for a distributed transaction, local read logic before the first piece of remote read logic in multiple pieces of statement logic included in the distributed transaction will be executed in the lock-free manner by default, which causes an exclusive lock to be missing on a data record corresponding to this part of the local read logic. Therefore, in this embodiment, this part of the local read logic may be supplemented with an exclusive lock. For example, there are three pieces of statement logic in the target transaction. The first piece of statement logic is local read logic, which results in that when executing the first piece of statement logic, read logic is executed in the lock-free manner by default, and therefore, no locking operation is performed on the first piece of statement logic, resulting in that no exclusive lock is acquired on data record(s) corresponding to the first piece of statement logic. It is then determined based on the second piece of statement logic (remote read logic) that the target transaction is a distributed transaction. To ensure that all data records involved in the read set of the distributed transaction acquire exclusive locks, the transaction coordinator may supplement exclusive lock(s) to the first piece of statement logic after the second piece of statement logic is executed. In addition, since the exclusive lock(s) is(are) supplemented to the data record(s) corresponding to the first piece of statement logic, consistency verification needs to be performed on the data record(s) corresponding to the first piece of statement logic, that is, it is necessary to verify whether this data record (these data records) has(have) been updated after the read operation on the first piece of statement logic is executed. If no update occurs, the target transaction may be processed normally. If an update occurs, the target transaction needs to be aborted or retried to avoid a processing result error of the target transaction due to the update of the data record(s) corresponding to the first piece of statement logic.

In this embodiment, the transaction coordinator of the target transaction may allocate a logical timestamp to the target transaction in the write phase of the target transaction. The logical timestamp is allocated based on an execution order of transactions, that is, the logical timestamp is used to represent the execution order of transactions, and may be understood as a serial number in essence. In this embodiment, the transaction coordinator needs to follow a certain allocation rule when allocating logical timestamps. The allocation rule may include, but is not limited to, that the logical timestamp is greater than the maximum value of read timestamps and write timestamps of data records in the read set, etc., which can ensure that the logical timestamps allocated to the transactions are increased monotonically. It should be understood here that there is no need to distinguish between the local transactions and the distributed transactions when allocating the logical timestamps, but rather, the two types of transactions are mixed together for allocation.

Based on the logical timestamp of the target transaction, the transaction coordinator may configure read timestamps and write timestamps corresponding to local data records thereof in the write phase. Therefore, in this embodiment, if a read timestamp of a local data record belonging to the transaction coordinator in the read set is less than the logical timestamp of the target transaction, the transaction coordinator may update the read timestamp of the local data record to the logical timestamp of the target transaction. The transaction coordinator may also update a read timestamp and a write timestamp of a local data record belonging to the transaction coordinator in the write set to the logical timestamp of the target transaction, which can ensure the freshness of the read timestamps and the write timestamps of the local data records belonging to the transaction coordinator in the read set and the write set. In addition, the transaction coordinator may also send the logical timestamp of the target transaction to the respective transaction participants involved in the write set. For a transaction participant of the target transaction, the logical timestamp allocated by the transaction coordinator to the target transaction may be acquired; in the read phase of the target transaction, if a read timestamp of a data record corresponding to a remote read operation initiated by the transaction coordinator is less than the logical timestamp of the target transaction, the read timestamp of the data record corresponding to the remote read operation is updated to the logical timestamp of the target transaction; in the write phase of the target transaction, a read timestamp and a write timestamp of a data record corresponding to a remote write operation initiated by the transaction coordinator are updated to the logical timestamp of the target transaction. In this way, the freshness of the read timestamps and the write timestamps of the related data records on the transaction participants of the target transaction can be ensured.

Based on this, the read timestamp and the write timestamp generated by the distributed transaction for the data record can serve as a basis for consistency verification of the local transaction. In this way, if the target transaction is determined as a local transaction, the transaction coordinator may perform consistency verification based on a read timestamp and/or a write timestamp possessed by a local data record belonging to the transaction coordinator in a read set of the target transaction. Similarly, for the transaction participant of the target transaction, if the transaction participant serves as the transaction coordinator for another transaction, in a case that the another transaction is a local transaction, consistency verification may be performed based on a read timestamp and/or a write timestamp of a local data record in a read set of the another transaction. Thus, whether the consistency problem exists in the read set of the local transaction can be found in time, and if it exists, the local transaction can be aborted or retried.

In addition, the inventors found during the research that a deadlock problem may occur in the technical solution of the embodiment. The deadlock problem may be understood as that two distributed transactions both need to wait for the other party to release a lock before continuing execution. For the deadlock problem, this embodiment provides an exemplary solution: if a deadlock problem occurs on any data record in the read phase of the target transaction, it is determined whether a start sequence code of the current transaction on that data record is less than a start sequence code of the target transaction. If yes, the target transaction is aborted or retried. In the same way, if no, release of the lock on that data record may be waited for, so as to continue processing the target transaction. This is because the current transaction on the data record will be aborted or retried since the start sequence code thereof is not less than the start sequence code of the target transaction, so that the lock on the data record is released, and thus the execution barrier of the target transaction is removed. The start sequence code is allocated by the transaction coordinator according to transaction start requests it receives, a transaction with an earlier start time may be allocated with a smaller start sequence code, and the start sequence code is unique. Here, the logical timestamp is not used to deal with the deadlock problem, mainly considering that the logical timestamp is only allocated in the write phase, and the deadlock problem occurs as early as in the read phase. It should be understood that in this embodiment, the deadlock problem may only occur in the read phase. Because the writing of the distributed transaction in the write phase may be performed without abort based on exclusive locks, and the writing of the local transaction in the write phase may also be implemented by adding exclusive locks, the deadlock problem does not occur in the write phase.

In this embodiment, the single phase commit solution proposed for the distributed transaction may be used as a distributed mode, and the solution of executing the write operation in the lock-free manner for the local transaction is used as a local mode. Based on this, different processing modes can be adopted for the local transaction and the distributed transaction, so as to alleviate the impact of exclusive locks introduced in the distributed transaction on the read phase of the local transaction, thereby ensuring the processing efficiency of the local transaction. In addition, by introducing the timestamp during the processing of the distributed transaction, the local transaction can be supported to perform consistency verification on its read set, thereby supporting coordination between the local transaction and the distributed transaction.

Figure 3:
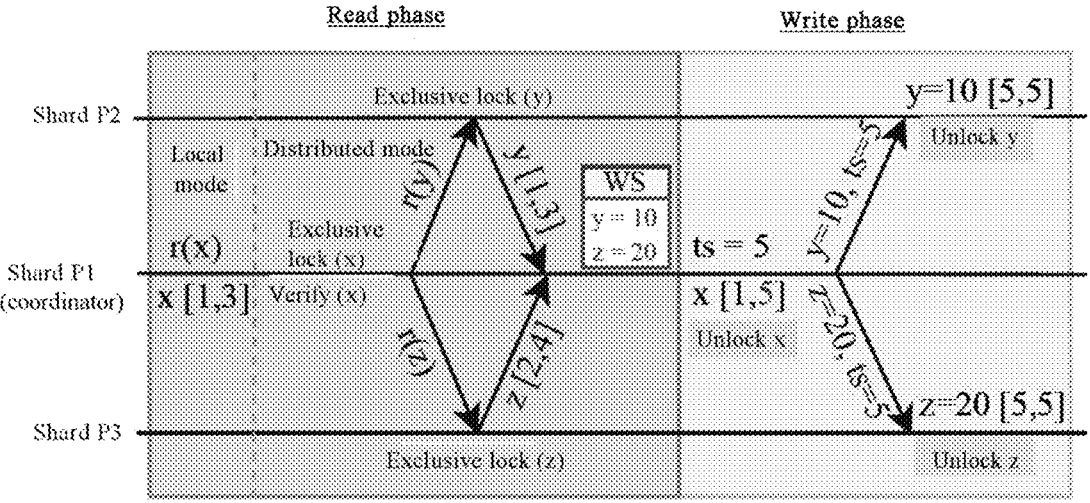
FIG. 3 is a schematic diagram of an exemplary application solution provided by an exemplary embodiment of the present application.

FIG. 3 is a schematic diagram of an exemplary application solution provided by an exemplary embodiment of the present application. Transaction processing logic provided by this embodiment is described below with reference to FIG. 3.

Referring to FIG. 3, in Transaction T, x, y, and z are read, and y and z need to be updated, where x, y, and z are located on Shards 1, 2, and 3 respectively. Shard 1 serves as the transaction coordinator for T, while Shards 2 and 3 serve as the transaction participants for T.

In the read phase of T, Shard 1 first executes T in a local mode (TicToc), and reads x in a lock-free manner, where wts (write timestamp)=1 for x, rts (read timestamp)=3 for x.

When remote reading involved in T is attempted to be performed, switching to a distributed mode will be performed and an exclusive lock will be supplemented on x.

Consistency verification is performed on x. If x is updated, Transaction T is directly aborted and retried in the distributed mode. Otherwise, entering to the distributed mode is successful and y and z are remotely read.

Shard 2 and Shard 3 respectively acquire corresponding exclusive locks, and return read results including wts and rts of data records to form a read set of T. Referring to FIG. 3, the returned wts and rts of Data record y are [1, 3], and the wts and rts of Data record z are [2, 4].

According to transaction logic, a write set of T ({y=10, z=20} in FIG. 3) is calculated, and then the write phase is entered.

In the write phase of T, Shard 1 allocates Logical timestamp Ts to T, which should be greater than the wts of x and the rts of y and z, resulting in Ts=5. Since the rts of x<Ts, the rts of x may be updated to 5.

Afterwards, Shard 1 unlocks x, sends remote writing for y and Ts=5 to Shard 2, and sends remote writing for z and Ts=5 to Shard 3.

When receiving the remote writing for y, Shard 2 updates a value of y to 10, initializes rts=wts=5 for y, and unlocks y.

When receiving the remote writing for z, Shard 3 updates a value of z to 20, initializes rts=wts=5 for z, and unlocks z.

The above exemplarily presents the transaction processing process in a case that the transaction T is a distributed transaction, and various timestamps configured in the processing process of the distributed transaction can support the processing process of other local transactions. It can be seen that the lock-holding time of the distributed transaction for Data records x, y, and z mentioned above has been minimized. Combined with the solution proposed in the previous embodiments of using the lock-free manner to perform write operations for the local transaction, the impact of the distributed transaction on the local transaction can be reduced effectively. Therefore, the throughput of transaction processing can be improved effectively as a whole.

As mentioned above, in the single phase commit solution provided by this embodiment for the distributed transaction, the distributed transaction immediately releases the related exclusive lock after completing the write operation, without waiting for its log record to be persisted. To this end, in this embodiment, a persistence check phase for the distributed transaction is also proposed. An exemplary persistence check solution may be: based on the logical timestamp allocated for the transaction, checking whether the target transaction has completed persistence on all of its transaction coordinator and transaction participants. The persistence means that, for the target transaction, log managers on the transaction coordinator and the participants will automatically persist log records corresponding to the target transaction into a hard disk, and only after the persistence of the log records is completed, the target transaction is considered to have completed global persistence. However, due to reasons such as different working efficiency of the log managers on different shards, the progress of the persistence work of different shards on the target transaction is different. Therefore, it is necessary to check whether the target transaction has completed global persistence on all shards involved.

In this exemplary solution, taking the transaction coordinator of the target transaction as an example, the minimum logical timestamp of non-persisted transactions on the transaction coordinator may be determined as a shard timestamp on the transaction coordinator based on logical timestamps respectively corresponding to transactions processed on the transaction coordinator; shard timestamps provided by other shards are acquired; the minimum value of shard timestamps respectively corresponding to all shards is taken as a global timestamp; and if the logical timestamp of the target transaction is less than the global timestamp, it is determined that the target transaction has completed global persistence processing. Here, each shard in the distributed system may determine its shard timestamp, acquire all shard timestamps provided by other shards, and calculate a global timestamp considered by itself. It should be noted that due to reasons such as different transactions and different processing progress, the global timestamps calculated respectively by different shards in the distributed system may not be the same, which is normal.

For a single shard, the minimum logical timestamp in local non-persisted transactions may be periodically checked to generate a shard timestamp. In a case that the shard timestamp on the shard changes, a new shard timestamp may be provided to other shards. In this way, in a case that the shard timestamp of the shard changes or a new shard timestamp provided by another shard is received, the shard may be triggered to recalculate a global timestamp considered by itself, thereby ensuring the freshness of the global timestamps on shards.

As mentioned above, the logical timestamp may be used to represent the execution order of transactions. In this embodiment, the shard timestamp is a threshold of the logical timestamps, so the shard timestamp has monotonicity. This monotonicity can ensure that the global timestamps calculated by respective shards can accurately reflect the transaction persistence situation on the respective shards of the distributed system, thereby ensuring that whether the target transaction has completed global persistence can be accurately determined.

However, in a process of performing persistence check based on the logical timestamp, there may be two problems. The first one is that logical timestamps may have not been allocated to some non-persisted transactions, resulting in that shards involved in the non-persisted transactions cannot determine the minimum logical timestamp. The second one is that after calculating a shard timestamp on a shard, a new transaction on the shard may be allocated a logical timestamp less than the shard timestamp, resulting in the monotonicity of the shard timestamp being destroyed.

For the first problem, still taking the transaction coordinator of the target transaction as an example, an exemplary solution may be: if there is a special transaction to which a logical timestamp is not allocated on the transaction coordinator of the target transaction, a write timestamp on a data record first accessed by the special transaction is taken as a lower limit of a logical timestamp of the special transaction, where the lower limit of the logical timestamp, instead of a logical timestamp, is used as a basis for determining a shard timestamp. Of course, for other shards in the distributed system, this exemplary solution can also be used to solve the first problem mentioned above.

For the second problem, in an exemplary solution, a logical timestamp allocated to a new transaction may be forced to be greater than a shard timestamp of a shard involved in the new transaction. To this end, two cases are considered. Still taking the transaction coordinator of the target transaction as an example, in one case, after determining the shard timestamp on the transaction coordinator, if the transaction coordinator subsequently serves as the coordinator of a new transaction, a logical timestamp allocated by the coordinator to the new transaction is not less than the shard timestamp. In another case, if the transaction coordinator subsequently serves as a participant of a new transaction, a write timestamp of a data record carried by it in a write set of the new transaction is updated to be not less than its shard timestamp, so as to drive the coordinator of the new transaction to allocate a logical timestamp not less than the shard timestamp to the new transaction. This corresponds to the logic of allocating a logical timestamp for a transaction mentioned above, that is, when allocating the logical timestamp for the transaction, it is necessary to ensure that the allocated logical timestamp is greater than the write timestamp of the data record in the read set. Therefore, here, by reasonably maintaining the write timestamp of the data record involved in the new transaction, the logical timestamp allocated for the new transaction is indirectly affected.

It can be seen that the solutions proposed under the above two problems can ensure the monotonicity of the shard timestamps calculated on the respective shards. This ensures the reasonability of the shard timestamps, thereby further ensuring the reasonability of the global timestamp.

Figure 4:
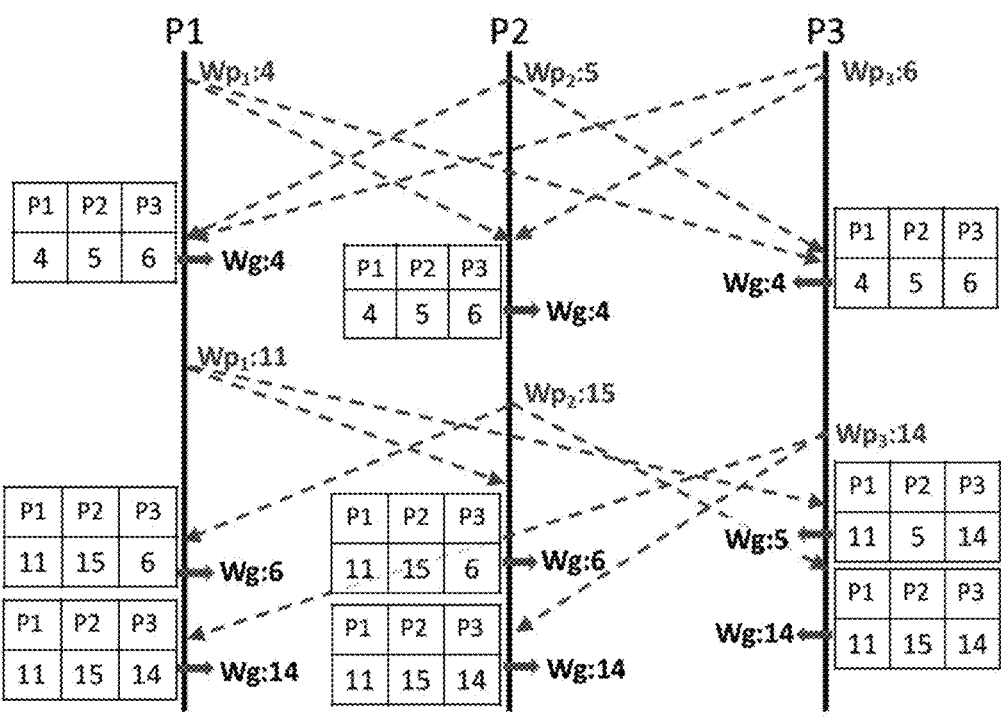
FIG. 4 is a schematic diagram of an application of a persistence check solution provided by an exemplary embodiment of the present application.

FIG. 4 is a schematic diagram of an application of a persistence check solution provided by an exemplary embodiment of the present application. Referring to FIG. 4, Shard P1, Shard P2, and Shard P3 in a distributed system maintain the latest shard timestamp tables respectively, and the tables record the latest shard timestamps provided by Shard P1, Shard P2, and Shard P3. The tables on the respective shards may be continuously updated, and the global timestamp is calculated by acquiring the smallest number in the table. For example, after receiving a shard timestamp Wp2=5 provided by Shard P2 and a shard timestamp Wp3=6 provided by Shard P3, combined with its own shard timestamp Wp1=4, Shard P1 calculates the global timestamp Wg=4. Shard timestamps do not have to be broadcast synchronously (for example, P3 may broadcast Wp3=14 later than other shards), and messages are also allowed to be delayed. Nevertheless, each shard will not block waiting messages from other shards, because each shard of them independently handles and retains transactions, and only communicates the "shard timestamp" asynchronously.

Here, for the target transaction, only its transaction coordinator determines whether the logical timestamp of the target transaction is less than the global timestamp calculated by the transaction coordinator. If yes, the transaction coordinator may determine that the target transaction has completed global persistence processing, and the transaction participant of the target transaction no longer needs to perform repeated determination. However, the transaction participant of the target transaction may also calculate a global timestamp considered by itself, because the transaction participant of the target transaction may also serve as the transaction coordinator of other transactions, and the global timestamp calculated by the transaction participant needs to serve as a basis for the persistence check process of such other transactions.

It can be seen that, in this embodiment, each shard in the distributed system can independently calculate the global timestamp, and each shard is only required to periodically broadcast the timestamp of its latest persisted transaction. In this way, each shard can learn shard timestamps of other shards and calculate the global timestamp, i.e., the minimum value of the shard timestamps of all shards. As the timestamps grow monotonically, it can be ensured that transactions with timestamps lower than the global timestamp have completed persistence on all shards. In general, by discarding the persistence check logic from the lock-holding period of the distributed transaction, and implementing the persistence check through an additional separate process, the lock-holding time of the distributed transaction can be effectively reduced. Furthermore, by allowing independent group commit of shards, a global coordination phase can be avoided through such group commit method, and the cost of the persistence check process is reduced, which can effectively improve the expandability of the distributed system. In a case that the distributed system is expanded, the cost of the persistence check process will not increase due to the addition of shards.

In addition, the inventors found during the research that local faults may occur in the distributed system, that is, faults such as downtime may occur on some shards. In this embodiment, it is proposed that the fault recovery problem in the distributed system may be solved based on the aforementioned global timestamp. An exemplary solution may be: in a case that a shard failure occurs, a recovery timestamp is acquired, where the recovery timestamp is the maximum value of global timestamps determined on all shards; and a transaction processed after the recovery timestamp is rolled back. The reason why the maximum value of the global timestamps determined on all shards is selected as the recovery timestamp is that: each shard independently maintains its own perspective of global timestamp during normal operation, and all global timestamps may serve as valid candidates; in order to reduce the number of transactions to be rolled back, all shards use the largest one as an agreed recovery timestamp. In this exemplary solution, the consensus mechanism in Zookeeper may be used to ensure that all shards use the same recovery timestamp. Then, transactions with logical timestamps Ts≥the recovery timestamp can be safely rolled back. For the failed shard, it rejoins the Zookeeper cluster after recovery to obtain the agreed recovery timestamp, then re-persists all transactions with Ts<the recovery timestamp, and rolls back transactions with Ts≥the recovery timestamp. To limit the recovery time, each shard will periodically retain a checkpoint of its state, so that it only needs to perform re-persistence after the checkpoint to recover.

In this embodiment, some typical problems in the transaction processing process may also be involved, including but not limited to processing problems of read-only transactions, processing problems of the read phase for data ranges, constraint checking problems, etc. The solutions to these problems may intersect with the technical solutions of this embodiment, and are only illustrated exemplarily here in brief without further elaboration. For example, for the processing problems of read-only transactions, an exemplary solution may be: in a case that the transaction coordinator of the target transaction determines that the target transaction is a read-only transaction according to its transaction logic, a "read-only" identification may be configured for the target transaction, and the read phase of the target transaction may be executed in a lock-free manner. Technologies such as snapshots may be used to optimize the read-only transaction to achieve lock-free reading. For another example, for processing problems of the read phase for data ranges, an exemplary solution may be: if the target transaction is a distributed transaction and its read phase involves a read operation on a data range, its transaction coordinator may acquire exclusive range locks (predicate locks) for the corresponding data range in the read phase of the target transaction, so as to ensure the exclusivity of the target transaction over that data range.

It should be understood that the typical problems in the transaction processing process are not limited to these, and there may be more problems. The solutions to these problems can be mutually adapted and cooperated with the technical solutions provided in this embodiment, and these typical problems are not exhausted herein.

Figure 5:
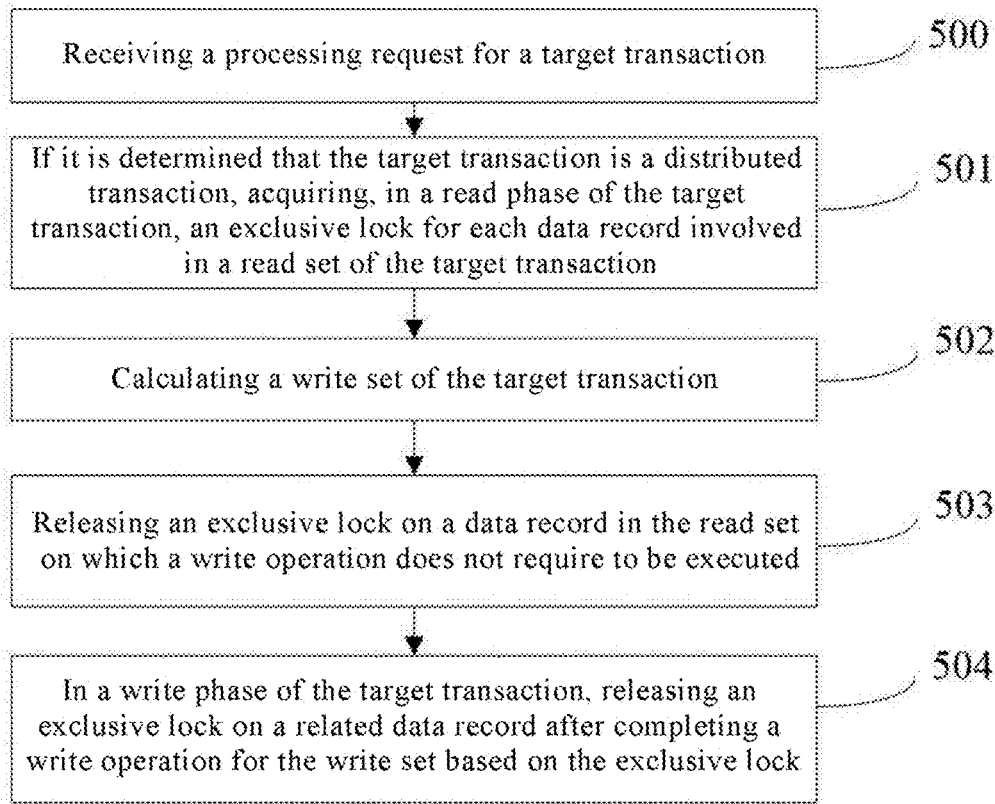
FIG. 5 is a schematic flowchart of a transaction processing method provided by another exemplary embodiment of the present application.

FIG. 5 is a schematic flowchart of a transaction processing method provided by another exemplary embodiment of the present application. The method may be executed by a data processing apparatus. The data processing apparatus may be implemented as a combination of software and/or hardware, and the data processing apparatus may be integrated into a transaction coordinator of a transaction. Referring to FIG. 5, the method may include the following steps.

Step 500: receiving a processing request for a target transaction.

Step 501: if it is determined that the target transaction is a distributed transaction, acquiring, in a read phase of the target transaction, an exclusive lock for each data record involved in a read set of the target transaction.

Step 502: calculating a write set of the target transaction.

Step 503: releasing an exclusive lock on a data record in the read set on which a write operation does not require to be executed.

Step 504: in a write phase of the target transaction, releasing an exclusive lock on a related data record after completing a write operation for the write set based on the exclusive lock.

In an embodiment, the step of acquiring, in the read phase of the target transaction, the exclusive lock for each data record involved in the read set of the target transaction includes:

determining a local data record belonging to the transaction coordinator in the read set;

adding an exclusive lock to the local data record;

triggering a transaction participant to which a non-local data record in the read set belongs to add an exclusive lock to the corresponding data record.

In an embodiment, the step of releasing the exclusive lock on the data record in the read set on which the write operation does not require to be executed includes:

in the write phase of the target transaction, if any local data record in the read set is determined as no write operation being required to be executed thereon, releasing the exclusive lock on the local data record.

In an embodiment, the method may further include:

in the read phase of the target transaction, running pieces of statement logic in the target transaction;

if there is remote read logic in the pieces of statement logic, determining that the target transaction is the distributed transaction.

In an embodiment, the method further includes:

if there is no remote read logic in the pieces of statement logic, determining that the target transaction is a local transaction;

in a case that the target transaction is the local transaction, executing a read operation in the read phase of the target transaction in a lock-free manner to obtain the read set of the target transaction;

acquiring, in the write phase of the target transaction, an exclusive lock for each data record involved in the write set of the target transaction to execute a write operation.

In an embodiment, the step of calculating the write set of the target transaction includes:

calculating the write set of the target transaction in the read phase of the target transaction;

caching the write set locally on the transaction coordinator for being invoked in the write phase.

In an embodiment, the step of releasing the exclusive lock on the related data record after completing the write operation for the write set based on the exclusive lock in the write phase of the target transaction includes:

in the write phase of the target transaction, determining a local data record belonging to the transaction coordinator in the write set;

releasing an exclusive lock on the local data record after completing a write operation based on the exclusive lock on the local data record;

initiating, for each non-local data record in the write set, a write operation to a transaction participant to which the non-local data record belongs, so that the transaction participant releases an exclusive lock on the corresponding data record after responding to the write operation.

In an embodiment, the method further includes:

in the write phase of the target transaction, allocating a logical timestamp to the target transaction, where the logical timestamp is allocated based on an execution order of transactions;

if a read timestamp of a local data record belonging to the transaction coordinator in the read set is less than the logical timestamp of the target transaction, updating the read timestamp of the local data record to the logical timestamp of the target transaction;

updating a read timestamp and a write timestamp of a local data record belonging to the transaction coordinator in the write set to the logical timestamp of the target transaction.

In an embodiment, the method further includes:

sending the logical timestamp of the target transaction to a transaction participant involved in the write set, so that the transaction participant updates, based on the logical timestamp of the target transaction, a read timestamp and/or a write timestamp of a data record carried by the transaction participant in the read set and/or the write set.

In an embodiment, the method further includes:

if it is determined that the target transaction is a local transaction, performing consistency verification based on a read timestamp and/or a write timestamp possessed by a local data record belonging to the transaction coordinator in a read set of the target transaction.

In an embodiment, the method further includes:

determining, based on logical timestamps respectively corresponding to transactions processed on the transaction coordinator, a minimum logical timestamp of non-persisted transactions on the transaction coordinator as a shard timestamp on the transaction coordinator;

acquiring shard timestamps provided by other shards;

taking a minimum value of shard timestamps respectively corresponding to all shards as a global timestamp;

if a logical timestamp of the target transaction is less than the global timestamp, determining that the target transaction has completed global persistence processing.

In an embodiment, the method further includes:

if there is a special transaction to which a logical timestamp is not allocated on the transaction coordinator, taking a write timestamp on a data record first accessed by the special transaction as a lower limit of a logical timestamp of the special transaction, where the lower limit of the logical timestamp, instead of a logical timestamp, is used as a basis for determining a shard timestamp.

In an embodiment, the method further includes:

after determining the shard timestamp on the transaction coordinator, if the transaction coordinator subsequently serves as a coordinator of a new transaction, allocating a logical timestamp not less than the shard timestamp to the new transaction;

if the transaction coordinator subsequently serves as a participant of a new transaction, updating a write timestamp of a data record carried by the participant in a write set of the new transaction to be not less than the shard timestamp of the participant, so as to drive a coordinator of the new transaction to allocate a logical timestamp not less than the shard timestamp to the new transaction.

In an embodiment, the method further includes:

in a case that a shard failure occurs, acquiring a recovery timestamp, where the recovery timestamp is a maximum value of global timestamps determined on all shards;

rolling back a transaction processed after the recovery timestamp.

It should be note that the technical details of the embodiments of the above transaction processing method can be found in the relevant descriptions of the transaction coordinator in the aforementioned system embodiments. In order to save space, these details will not be repeated here, which should not cause loss to the protection scope of the present application.

FIG. 6 is a schematic flowchart of another transaction processing method provided by another exemplary embodiment of the present application. The method may be executed by a data processing apparatus. The data processing apparatus may be implemented as a combination of software and/or hardware, and the data processing apparatus may be integrated into a transaction participant of a transaction. Referring to FIG. 6, the method may include the following steps.

Step 600: in a case that a target transaction is a distributed transaction, receiving a remote read operation initiated by a transaction coordinator of the target transaction in a read phase of the target transaction.

Step 601: in the read phase, adding an exclusive lock to a data record requested by the remote read operation.

Step 602: in a write phase of the target transaction, if a remote write operation initiated by the transaction coordinator is received, responding to the remote write operation and releasing an exclusive lock on a corresponding data record.

In an embodiment, the method further includes:

acquiring a logical timestamp allocated by the transaction coordinator to the target transaction, where the logical timestamp is allocated based on an execution order of transactions;

in the read phase, if a read timestamp of the data record corresponding to the remote read operation is less than the logical timestamp of the target transaction, updating the read timestamp of the data record corresponding to the remote read operation to the logical timestamp of the target transaction;

in the write phase, updating a read timestamp and a write timestamp of the data record corresponding to the remote write operation to the logical timestamp of the target transaction.

In an embodiment, the method further includes:

if the transaction participant serves as a transaction coordinator of another transaction, performing, in a case that the another transaction is a local transaction, consistency verification based on a read timestamp and/or a write timestamp of a local data record in a read set of the another transaction.

In an embodiment, the method further includes:

determining, based on logical timestamps respectively corresponding to transactions processed on the transaction participant, a minimum logical timestamp of non-persisted transactions on the transaction participant as a shard timestamp on the transaction participant;

providing the shard timestamp of the transaction participant to the transaction coordinator of the target transaction, so that the transaction coordinator takes a minimum value of shard timestamps respectively corresponding to all shards as a global timestamp, and determines that the target transaction has completed global persistence processing in a case that a logical timestamp of the target transaction is less than the global timestamp.

In an embodiment, the method further includes:

after determining the shard timestamp, if the transaction participant subsequently serves as a coordinator of a new transaction, allocating a logical timestamp not less than the shard timestamp to the new transaction;

if the transaction participant subsequently serves as a participant of a new transaction, updating a write timestamp of a data record carried by the participant in a write set of the new transaction to be not less than the shard timestamp, so as to drive a coordinator of the new transaction to allocate a logical timestamp not less than the shard timestamp to the new transaction.

It should be note that the technical details of the embodiments of the above transaction processing method can be found in the relevant descriptions of the transaction participant in the aforementioned system embodiments. In order to save space, these details will not be repeated here, which should not cause loss to the protection scope of the present application.

In addition, some flows described in the above embodiments and the accompanying drawings include multiple operations that appear in a specific order. However, it should be clearly understood that these operations may not be executed in the order they appear in this specification or executed in parallel. The serial numbers of the operations, such as 501, 502, etc., are only used to distinguish different operations, and the serial numbers themselves do not represent any execution order. In addition, these flows may include more or fewer operations, and these operations may be executed sequentially or in parallel.

FIG. 7 is a schematic structural diagram of a transaction coordinator provided by yet another exemplary embodiment of the present application. As shown in FIG. 7, the transaction coordinator may include: a memory 70, a processor 71, and a communication component 72.

The processor 71 is coupled to the memory 70 and the communication component 72, and is configured to execute a computer program in the memory 70 to:

receive a processing request for a target transaction through the communication component 72;

if it is determined that the target transaction is a distributed transaction, acquire, in a read phase of the target transaction, an exclusive lock for each data record involved in a read set of the target transaction;

calculate a write set of the target transaction;

release an exclusive lock on a data record in the read set on which a write operation does not require to be executed;

in a write phase of the target transaction, release an exclusive lock on a related data record after completing a write operation for the write set based on the exclusive lock.

In an embodiment, in the process of acquiring, in the read phase of the target transaction, the exclusive lock for each data record involved in the read set of the target transaction, the processor 71 may be configured to:

determine a local data record belonging to the transaction coordinator in the read set;

add an exclusive lock to the local data record;

trigger a transaction participant to which a non-local data record in the read set belongs to add an exclusive lock to the corresponding data record.

In an embodiment, in the process of releasing the exclusive lock on the data record in the read set on which the write operation does not require to be executed, the processor 71 may be configured to:

in the write phase of the target transaction, if any local data record in the read set is determined as no write operation being required to be executed thereon, release the exclusive lock on the local data record.

In an embodiment, the processor 71 may be further configured to:

in the read phase of the target transaction, run pieces of statement logic in the target transaction;

if there is remote read logic in the pieces of statement logic, determine that the target transaction is the distributed transaction.

In an embodiment, the processor 71 may be further configured to:

if there is no remote read logic in the pieces of statement logic, determine that the target transaction is a local transaction;

in a case that the target transaction is the local transaction, execute a read operation in the read phase of the target transaction in a lock-free manner to obtain the read set of the target transaction;

acquire, in the write phase of the target transaction, an exclusive lock for each data record involved in the write set of the target transaction to execute a write operation.

In an embodiment, in the process of calculating the write set of the target transaction, the processor 71 may be configured to:

calculate the write set of the target transaction in the read phase of the target transaction;

cache the write set locally on the transaction coordinator for being invoked in the write phase.

In an embodiment, in the process of releasing the exclusive lock on the related data record after completing the write operation for the write set based on the exclusive lock in the write phase of the target transaction, the processor 71 may be configured to:

in the write phase of the target transaction, determine a local data record belonging to the transaction coordinator in the write set;

release an exclusive lock on the local data record after completing a write operation based on the exclusive lock on the local data record;

initiate, for each non-local data record in the write set, a write operation to a transaction participant to which the non-local data record belongs, so that the transaction participant releases an exclusive lock on the corresponding data record after responding to the write operation.

In an embodiment, the processor 71 may be further configured to:

in the write phase of the target transaction, allocate a logical timestamp to the target transaction, where the logical timestamp is allocated based on an execution order of transactions;

if a read timestamp of a local data record belonging to the transaction coordinator in the read set is less than the logical timestamp of the target transaction, update the read timestamp of the local data record to the logical timestamp of the target transaction;

update a read timestamp and a write timestamp of a local data record belonging to the transaction coordinator in the write set to the logical timestamp of the target transaction.

In an embodiment, the processor 71 may be further configured to:

send the logical timestamp of the target transaction to a transaction participant involved in the write set, so that the transaction participant updates, based on the logical timestamp of the target transaction, a read timestamp and/or a write timestamp of a data record carried by the transaction participant in the read set and/or the write set.

In an embodiment, the processor 71 may be further configured to:

if it is determined that the target transaction is a local transaction, perform consistency verification based on a read timestamp and/or a write timestamp possessed by a local data record belonging to the transaction coordinator in a read set of the target transaction.

In an embodiment, the processor 71 may be further configured to:

determine, based on logical timestamps respectively corresponding to transactions processed on the transaction coordinator, a minimum logical timestamp of non-persisted transactions on the transaction coordinator as a shard timestamp on the transaction coordinator;

acquire shard timestamps provided by other shards;

take a minimum value of shard timestamps respectively corresponding to all shards as a global timestamp;

if a logical timestamp of the target transaction is less than the global timestamp, determine that the target transaction has completed global persistence processing.

In an embodiment, the processor 71 may be further configured to:

if there is a special transaction to which a logical timestamp is not allocated on the transaction coordinator, take a write timestamp on a data record first accessed by the special transaction as a lower limit of a logical timestamp of the special transaction, where the lower limit of the logical timestamp, instead of a logical timestamp, is used as a basis for determining a shard timestamp.

In an embodiment, the processor 71 may be further configured to:

after determining the shard timestamp on the transaction coordinator, if the transaction coordinator subsequently serves as a coordinator of a new transaction, allocate a logical timestamp not less than the shard timestamp to the new transaction;

if the transaction coordinator subsequently serves as a participant of a new transaction, update a write timestamp of a data record carried by the participant in a write set of the new transaction to be not less than the shard timestamp of the participant, so as to drive a coordinator of the new transaction to allocate a logical timestamp not less than the shard timestamp to the new transaction.

In an embodiment, the processor 71 may be further configured to:

in a case that a shard failure occurs, acquire a recovery timestamp, where the recovery timestamp is a maximum value of global timestamps determined on all shards;

roll back a transaction processed after the recovery timestamp.

Further, as shown in FIG. 7, the transaction coordinator further includes other components such as a power supply component 73. FIG. 7 only schematically shows some components, which does not mean that the transaction coordinator only includes the components shown in FIG. 7.

It should be note that the technical details of the embodiments of the above transaction coordinator can be found in the relevant descriptions of the transaction coordinator in the aforementioned system embodiments. In order to save space, these details will not be repeated here, which should not cause loss to the protection scope of the present application.

Figure 8:
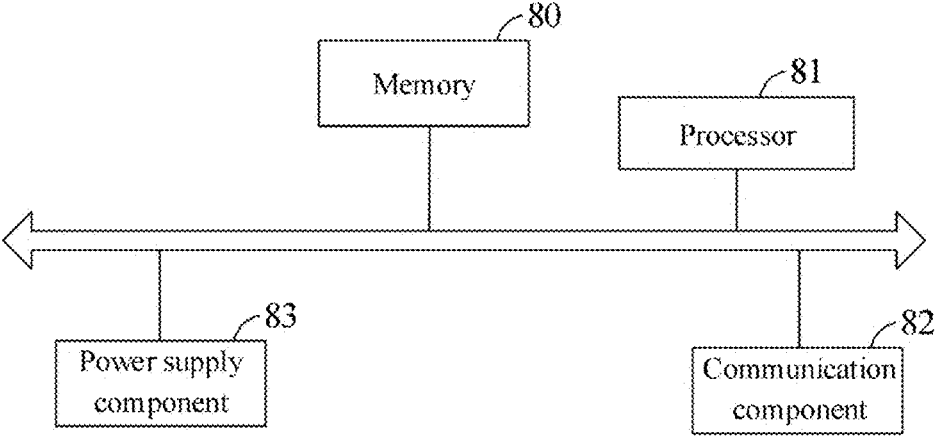
FIG. 8 is a schematic structural diagram of a transaction participant provided by yet another exemplary embodiment of the present application.

FIG. 8 is a schematic structural diagram of a transaction participant provided by yet another exemplary embodiment of the present application. As shown in FIG. 8, the transaction participant may include: a memory 80, a processor 81, and a communication component 82.

The processor 81 is coupled to the memory 80 and the communication component 82, and is configured to execute a computer program in the memory 80 to:

in a case that a target transaction is a distributed transaction, receive, through the communication component 82, a remote read operation initiated by a transaction coordinator of the target transaction in a read phase of the target transaction;

in the read phase, add an exclusive lock to a data record requested by the remote read operation;

in a write phase of the target transaction, if a remote write operation initiated by the transaction coordinator is received, respond to the remote write operation and release an exclusive lock on a corresponding data record In an embodiment, the processor 81 may be further configured to:

acquire a logical timestamp allocated by the transaction coordinator to the target transaction, where the logical timestamp is allocated based on an execution order of transactions;

in the read phase, if a read timestamp of the data record corresponding to the remote read operation is less than the logical timestamp of the target transaction, update the read timestamp of the data record corresponding to the remote read operation to the logical timestamp of the target transaction;

in the write phase, update a read timestamp and a write timestamp of the data record corresponding to the remote write operation to the logical timestamp of the target transaction.

In an embodiment, the processor 81 may be further configured to:

if the transaction participant serves as a transaction coordinator of another transaction, perform, in a case that the another transaction is a local transaction, consistency verification based on a read timestamp and/or a write timestamp of a local data record in a read set of the another transaction.

In an embodiment, the processor 81 may be further configured to:

determine, based on logical timestamps respectively corresponding to transactions processed on the transaction participant, a minimum logical timestamp of non-persisted transactions on the transaction participant as a shard timestamp on the transaction participant;

provide the shard timestamp of the transaction participant to the transaction coordinator of the target transaction, so that the transaction coordinator takes a minimum value of shard timestamps respectively corresponding to all shards as a global timestamp, and determines that the target transaction has completed global persistence processing in a case that a logical timestamp of the target transaction is less than the global timestamp.

In an embodiment, the processor 81 may be further configured to:

after determining the shard timestamp, if the transaction participant subsequently serves as a coordinator of a new transaction, allocate a logical timestamp not less than the shard timestamp to the new transaction;

if the transaction participant subsequently serves as a participant of a new transaction, update a write timestamp of a data record carried by the participant in a write set of the new transaction to be not less than the shard timestamp, so as to drive a coordinator of the new transaction to allocate a logical timestamp not less than the shard timestamp to the new transaction.

Further, as shown in FIG. 8, the transaction participant further includes other components such as a power supply component 83. FIG. 8 only schematically shows some components, which does not mean that the transaction participant only includes the components shown in FIG. 8.

It should be note that the technical details of the embodiments of the above transaction participant can be found in the relevant descriptions of the transaction participant in the aforementioned system embodiments. In order to save space, these details will not be repeated here, which should not cause loss to the protection scope of the present application.

Correspondingly, an embodiment of the present application further provides a computer-readable storage medium storing a computer program, and when the computer program is executed, the steps that can be executed by the transaction coordinator or the transaction participant in the above method embodiments can be implemented.

The memory shown in FIG. 7 and FIG. 8 is configured to store a computer program and can be configured to store various other data to support operations on a computing platform. Examples of the data include instructions for any application or method used to operate on the computing platform, contact data, phonebook data, messages, images, videos, etc. The memory may be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic storage, a flash memory, a magnetic disk or an optical disk.

The communication component in FIG. 7 and FIG. 8 is configured to facilitate wired or wireless communication between a device where the communication component is located and other devices. The device where the communication component is located may access a wireless network based on a communication standard, such as WiFi, 2G, 3G, 4G/LTE, or 5G, or a combination thereof. In an exemplary embodiment, the communication component receives a broadcast signal or broadcast related information from an external broadcast management system via a broadcast channel. In an exemplary embodiment, the communication component also includes a near field communication (NFC)

module to facilitate short-range communication. For example, the NFC module may be implemented based on radio frequency identification (RFID) technology, infrared data association (IrDA) technology, ultra wideband (UWB) technology, Bluetooth (BT) technology, and other technologies.

The power supply component in FIG. 7 and FIG. 8 supplies power to various components of a device where the power supply component is located. The power supply component may include a power management system, one or more power supplies, and other components associated with generating, managing, and distributing power for the device where the power supply component is located.

Those skilled in the art should understand that embodiments of the present application may be provided as a method, a system, or a computer program product. Therefore, the present application may take a form of an embodiment entirely in hardware, an embodiment entirely in software, or an embodiment combining software and hardware aspects. Moreover, the present application may take a form of a computer program product implemented on one or more computer usable storage media (including but not limited to a disk memory, a CD-ROM, an optical memory, etc.) including computer usable program code.

The present application is described with reference to flowcharts and/or block diagrams of the methods, devices (systems), and computer program products according to the embodiments of the present application. It should be understood that each flow and/or block in the flowcharts and/or block diagrams, and combinations of flows and/or blocks in the flowcharts and/or block diagrams may be implemented by computer program instructions. These computer program instructions may be provided to a processor of a general-purpose computer, a special-purpose computer, an embedded processor, or other programmable data processing devices to generate a machine, so that the instructions executed by the processor of the computer or the other programmable data processing devices generate an apparatus for implementing functions specified in one or more flows of the flowcharts and/or one or more blocks of the block diagrams.

These computer program instructions may also be stored in a computer-readable memory that can guide the computer or the other programmable data processing devices to work in a specific manner, so that the instructions stored in the computer-readable memory generate a manufactured product including an instruction apparatus, and the instruction apparatus implements functions specified in one or more flows of the flowcharts and/or one or more blocks of the block diagrams.

These computer program instructions may also be loaded onto the computer or the other programmable data processing devices, so that a series of operation steps are executed on the computer or the other programmable devices to generate computer-implemented processing, and thus the instructions executed on the computer or the other programmable devices provide steps for implementing functions specified in one or more flows of the flowcharts and/or one or more blocks of the block diagrams.

In a typical configuration, a computing device includes one or more processors (CPUs), an input/output interface, a network interface, and a memory.

The memory may include forms such as a non-permanent memory, a random access memory (RAM), and/or a non-volatile memory, such as a read-only memory (ROM) or a flash memory (flash RAM), in computer-readable media. The memory is an example of a computer-readable medium.

The computer-readable media, including permanent and non-permanent, removable and non-removable media, may implement information storage by any method or technology. Information may be computer-readable instructions, data structures, modules of programs, or other data. Examples of storage media for computers include, but are not limited to, a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disk read-only memory (CD-ROM), a digital versatile disk (DVD) or other optical storage, a magnetic-cartridge tape, a magnetic-tape disk storage or other magnetic storage devices, or any other non-transmission media that may be used to store information that can be accessed by computing devices. According to the definition herein, the computer-readable media do not include transitory computer-readable media (transitory media), such as modulated data signals and carriers.

It should also be noted that terms "including", "comprising", or any other variations thereof are intended to cover non-exclusive inclusion, such that a process, method, commodity or device including a series of elements not only includes those elements, but also includes other elements that are not explicitly listed, or also includes elements inherent to such process, method, commodity or device. Without further limitations, an element defined by a statement "including a/an/one . . . " does not exclude the existence of other identical elements in the process, method, commodity or device including that element.

Those described above are only embodiments of the present application, and are not intended to limit the present application. For those skilled in the art, the present application may have various modifications and variations. Any modifications, equivalent substitutions, improvements, etc., made within the spirit and principles of the present application, shall be included within the protection scope of the present application.

The invention claimed is:

1. A transaction processing method, applied to a transaction coordinator of a distributed system, the method comprising:

receiving a processing request for a target transaction;

determining that the target transaction is a distributed transaction, thereby acquiring in a read phase of the target transaction, an exclusive lock for each data record involved in a read set of the target transaction;

calculating a write set of the target transaction;

releasing an exclusive lock on a data record in the read set on which a write operation does not require to be executed;

in a write phase of the target transaction, releasing an exclusive lock on a related data record after completing a write operation for the write set based on the exclusive lock;

determining, based on logical timestamps respectively corresponding to transactions processed on the transaction coordinator, a minimum logical timestamp of non-persisted transactions on the transaction coordinator as a shard timestamp on the transaction coordinator;

acquiring shard timestamps provided by other shards;

taking a minimum value of shard timestamps respectively corresponding to all shards as a global timestamp; and determining that the target transaction has completed global persistence processing based on a logical timestamp of the target transaction is less than the global timestamp.

2. The method according to claim 1, wherein acquiring, in the read phase of the target transaction, the exclusive lock for each data record involved in the read set of the target transaction comprises:

determining a local data record belonging to the transaction coordinator in the read set;

adding an exclusive lock to the local data record;

triggering a transaction participant to which a non-local data record in the read set belongs to add an exclusive lock to the corresponding data record.

3. The method according to claim 2, wherein releasing the exclusive lock on the data record in the read set on which the write operation does not require to be executed comprises:

in the write phase of the target transaction, if any local data record in the read set is determined as no write operation being required to be executed thereon, releasing the exclusive lock on the local data record.

4. The method according to claim 1, further comprising:

in the read phase of the target transaction, running pieces of statement logic in the target transaction;

if there is remote read logic in the pieces of statement logic, determining that the target transaction is the distributed transaction.

5. The method according to claim 4, further comprising:

if there is no remote read logic in the pieces of statement logic, determining that the target transaction is a local transaction;

in a case that the target transaction is the local transaction, executing a read operation in the read phase of the target transaction in a lock-free manner to obtain the read set of the target transaction;

acquiring, in the write phase of the target transaction, an exclusive lock for each data record involved in the write set of the target transaction to execute a write operation.

6. The method according to claim 1, wherein calculating the write set of the target transaction comprises:

calculating the write set of the target transaction in the read phase of the target transaction;

caching the write set locally on the transaction coordinator for being invoked in the write phase.

7. The method according to claim 1, wherein in the write phase of the target transaction, releasing the exclusive lock on the related data record after completing the write operation for the write set based on the exclusive lock comprises:

in the write phase of the target transaction, determining a local data record belonging to the transaction coordinator in the write set;

releasing an exclusive lock on the local data record after completing a write operation based on the exclusive lock on the local data record;

initiating, for each non-local data record in the write set, a write operation to a transaction participant to which the non-local data record belongs, so that the transaction participant releases an exclusive lock on the corresponding data record after responding to the write operation.

8. The method according to claim 1, further comprising:

in the write phase of the target transaction, allocating a logical timestamp to the target transaction, wherein the logical timestamp is allocated based on an execution order of transactions;

if a read timestamp of a local data record belonging to the transaction coordinator in the read set is less than the logical timestamp of the target transaction, updating the read timestamp of the local data record to the logical timestamp of the target transaction;

updating a read timestamp and a write timestamp of a local data record belonging to the transaction coordinator in the write set to the logical timestamp of the target transaction; and sending the logical timestamp of the target transaction to a transaction participant involved in the write set, so that the transaction participant updates, based on the logical timestamp of the target transaction, a read timestamp and/or a write timestamp of a data record carried by the transaction participant in the read set and/or the write set.

9. The method according to claim 8, further comprising:

if it is determined that the target transaction is a local transaction, performing consistency verification based on a read timestamp and/or a write timestamp possessed by a local data record belonging to the transaction coordinator in a read set of the target transaction.

10. The method according to claim 1, further comprising:

in a case that a shard failure occurs, acquiring a recovery timestamp, wherein the recovery timestamp is a maximum value of global timestamps determined on all shards; and rolling back a transaction processed after the recovery timestamp.

11. The method according to claim 1, further comprising:

if there is a special transaction to which a logical timestamp is not allocated on the transaction coordinator, taking a write timestamp on a data record first accessed by the special transaction as a lower limit of a logical timestamp of the special transaction, wherein the lower limit of the logical timestamp, instead of a logical timestamp, is used as a basis for determining a shard timestamp.

12. The method according to claim 1, further comprising:

after determining the shard timestamp on the transaction coordinator, if the transaction coordinator subsequently serves as a coordinator of a new transaction, allocating a logical timestamp not less than the shard timestamp to the new transaction;

if the transaction coordinator subsequently serves as a participant of a new transaction, updating a write timestamp of a data record carried by the participant in a write set of the new transaction to be not less than the shard timestamp of the participant, so as to drive a coordinator of the new transaction to allocate a logical timestamp not less than the shard timestamp to the new transaction.

13. A transaction processing method, applied to a transaction participant of a distributed system, the method comprising:

determining that a target transaction is a distributed transaction to receive a remote read operation initiated by a transaction coordinator of the target transaction in a read phase of the target transaction;

in the read phase, adding an exclusive lock to a data record requested by the remote read operation;

in a write phase of the target transaction, receiving a remote write operation initiated by the transaction coordinator thereby responding to the remote write operation and releasing an exclusive lock on a corresponding data record;

determining, based on logical timestamps respectively corresponding to transactions processed on the transaction participant, a minimum logical timestamp of non-persisted transactions on the transaction participant as a shard timestamp on the transaction participant; and providing the shard timestamp of the transaction participant to the transaction coordinator of the target transaction, so that the transaction coordinator takes a minimum value of shard timestamps respectively corresponding to all shards as a global timestamp, and determines that the target transaction has completed global persistence processing based on a logical timestamp of the target transaction is less than the global timestamp.

14. The method according to claim 13, further comprising:

acquiring a logical timestamp allocated by the transaction coordinator to the target transaction, wherein the logical timestamp is allocated based on an execution order of transactions;

in the read phase, if a read timestamp of the data record corresponding to the remote read operation is less than the logical timestamp of the target transaction, updating the read timestamp of the data record corresponding to the remote read operation to the logical timestamp of the target transaction;

in the write phase, updating a read timestamp and a write timestamp of the data record corresponding to the remote write operation to the logical timestamp of the target transaction.

15. The method according to claim 14, further comprising:

if the transaction participant serves as a transaction coordinator of another transaction, performing, in a case that the another transaction is a local transaction, consistency verification based on a read timestamp and/or a write timestamp of a local data record in a read set of the another transaction.

16. The method according to claim 13, further comprising:

after determining the shard timestamp, if the transaction participant subsequently serves as a coordinator of a new transaction, allocating a logical timestamp not less than the shard timestamp to the new transaction; and if the transaction participant subsequently serves as a participant of a new transaction, updating a write timestamp of a data record carried by the participant in a write set of the new transaction to be not less than the shard timestamp, so as to drive a coordinator of the new transaction to allocate a logical timestamp not less than the shard timestamp to the new transaction.

17. A transaction coordinator of a distributed system, comprising a memory, a processor, and a communication component;

the memory is configured to store one or more computer instructions;

the processor is coupled to the memory and the communication component, and is configured to execute the one or more computer instructions to:

receive a processing request for a target transaction through the communication component;

determining that the target transaction is a distributed transaction, thereby acquiring, in a read phase of the target transaction, an exclusive lock for each data record involved in a read set of the target transaction;

calculate a write set of the target transaction;

release an exclusive lock on a data record in the read set on which a write operation does not require to be executed;

in a write phase of the target transaction, release an exclusive lock on a related data record after completing a write operation for the write set based on the exclusive lock;

determine, based on logical timestamps respectively corresponding to transactions processed on the transaction coordinator, a minimum logical timestamp of non-persisted transactions on the transaction coordinator as a shard timestamp on the transaction coordinator;

acquire shard timestamps provided by other shards;

take a minimum value of shard timestamps respectively corresponding to all shards as a global timestamp; and determine that the target transaction has completed global persistence processing based on a logical timestamp of the target transaction is less than the global timestamp.

18. A transaction participant of a distributed system, comprising a memory, a processor, and a communication component;

the memory is configured to store one or more computer instructions; and the processor is coupled to the memory and the communication component, and is configured to execute the one or more computer instructions to perform the transaction processing method according to claim 13.

19. A non-transitory computer-readable storage medium storing computer instructions, wherein when the computer instructions are executed by one or more processors, the one or more processors are caused to perform the transaction processing method according to claim 1.

20. A non-transitory computer-readable storage medium storing computer instructions, wherein when the computer instructions are executed by one or more processors, the one or more processors are caused to perform the transaction processing method according to claim 13.

* * * * *